(12) United States Patent
Ido

(10) Patent No.: US 7,871,958 B2
(45) Date of Patent: Jan. 18, 2011

(54) CATALYST CARRIER

(75) Inventor: Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 428 days.

(21) Appl. No.: 11/853,658

(22) Filed: Sep. 11, 2007

(65) Prior Publication Data

US 2008/0241465 A1 Oct. 2, 2008

(30) Foreign Application Priority Data

Mar. 30, 2007 (WO) .................. PCT/JP2007/057256

(51) Int. Cl.
| | |
|---|---|
| B01J 23/70 | (2006.01) |
| B01J 23/42 | (2006.01) |
| B01J 23/44 | (2006.01) |
| B01D 39/06 | (2006.01) |
| B01D 39/20 | (2006.01) |
| B01D 39/02 | (2006.01) |
| B01D 39/14 | (2006.01) |
| B01D 46/00 | (2006.01) |
| B01D 50/00 | (2006.01) |
| B01D 53/34 | (2006.01) |
| B05D 1/12 | (2006.01) |
| B05D 7/22 | (2006.01) |
| B29C 47/00 | (2006.01) |
| B29C 47/12 | (2006.01) |

(52) U.S. Cl. .................. 502/439; 502/339; 502/527.19; 55/523; 55/524; 55/527; 55/529; 264/177.12; 422/180; 427/180; 427/181

(58) Field of Classification Search .................. 502/493, 502/439, 339, 527.19; 55/523, 385.3, 483, 55/524, 529, DIG. 30, 527; 428/327, 323, 428/116, 117, 119, 188, 690, 913; 264/177.12; 422/168, 180; 60/299

See application file for complete search history.

(56) References Cited

U.S. PATENT DOCUMENTS

| | | | |
|---|---|---|---|
| 6,960,386 B2 * | 11/2005 | Agata | 428/323 |
| 7,662,458 B2 * | 2/2010 | Ninomiya et al. | 428/116 |
| 2005/0266992 A1 | 12/2005 | Ohno et al. | |
| 2006/0101747 A1 | 5/2006 | Masukawa et al. | |
| 2006/0168908 A1 | 8/2006 | Ichikawa et al. | |
| 2007/0004592 A1 * | 1/2007 | Ohno et al. | 502/439 |
| 2007/0084171 A1 * | 4/2007 | Kaneko | 55/523 |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |

FOREIGN PATENT DOCUMENTS

EP   1479881   11/2004

(Continued)

*Primary Examiner*—Steven Bos
*Assistant Examiner*—Anthony J Zimmer
(74) *Attorney, Agent, or Firm*—Ditthavong Mori & Steiner, P.C.

(57) ABSTRACT

A catalyst carrier includes a honeycomb structure where cells extending in a longitudinal direction are divided by cell walls; and a coating layer provided at a peripheral part of the honeycomb structure. The honeycomb structure and the coating layer contain at least one of inorganic fibers and whiskers. At least one of the inorganic fiber and whisker contained in the honeycomb structure is oriented mainly in a first direction. At least one of the inorganic fiber and whisker contained in the coating layer is oriented mainly in a second direction. The first direction and the second direction cross at substantially right angles to each other.

18 Claims, 4 Drawing Sheets

FOREIGN PATENT DOCUMENTS

| | | |
|---|---|---|
| EP | 1632657 | 3/2006 |
| EP | 1736221 | 12/2006 |
| JP | 62-36088 | 2/1987 |
| JP | 2000-102709 | 4/2000 |
| JP | 2002-177719 | 6/2002 |
| JP | 2005-087805 | 4/2005 |
| JP | 2005-218935 | 8/2005 |
| JP | 2005-349378 | 12/2005 |
| JP | 2006-326574 | 12/2006 |
| WO | WO2005/047209 | 5/2005 |

\* cited by examiner

CATALYST CARRIER

CROSS-REFERENCE TO RELATED APPLICATIONS

The present application claims priority under 35 U.S.C. §119 to PCT application No. PCT/JP2007/057256, filed in Japan on Mar. 30, 2007 entitles "CATALYST CARRIER." The contents of this application are incorporated herein by reference in their entirety.

BACKGROUND OF THE INVENTION

1. Field of the Invention

The present invention generally relates to catalyst carriers.

2. Discussion of the Background

Conventionally, various exhaust gas processing devices for internal combustion engines of vehicles, construction machinery, or the like have been suggested, and these have been used in practice. A typical exhaust gas processing device has a casing made of, for example, metal or the like on an exhaust pipe connected to an exhaust gas manifold of the engine. A honeycomb structure is provided in the casing. This honeycomb structure composes a catalyst carrier configured to convert harmful gas or the like in exhaust gas by catalytic reaction.

This catalyst carrier is manufactured by, for example, supporting a catalyst carrier layer such as γ-aluminum and a catalyst such as platinum at a cell wall of a cordierite honeycomb structure having low thermal expansion properties. Harmful gas such as CO, HC, and NOx contained in the exhaust gas is converted by the catalyst provided at the cell wall.

In the catalyst carrier having such a honeycomb structure, in order to improve its converting ability of the exhaust gas, it is necessary to improve the contact ratio of the exhaust gas and the catalyst such as a noble metal. As a catalyst carrier to solve such a problem, a honeycomb structure made of a high specific surface area material such as aluminum and inorganic fibers and having a high specific surface area has been suggested in, for example, Japanese Unexamined Patent Application Publication Nos. 2005-218935 and 2005-349378.

These Japanese Publications No. 2005-218935 and No. 2005-349378 are hereby incorporated herein by reference in their entirety.

SUMMARY OF THE INVENTION

In one aspect of the present invention, a catalyst carrier includes a honeycomb structure where cells extending in a longitudinal direction are divided by cell walls; and a coating layer provided at a peripheral part of the honeycomb structure; wherein the honeycomb structure and the coating layer contain at least one of the inorganic fiber and whiskers; at least one of the inorganic fiber and the whisker contained in the honeycomb structure is oriented mainly in a first direction and at least one of the inorganic fiber and the whisker contained in the coating layer is oriented mainly in a second direction; and the first direction and the second direction cross at substantially right angles to each other.

BRIEF DESCRIPTION OF DRAWINGS

Other objects, features, and advantages of the present invention will be come more apparent from the following detailed description when read in conjunction with the accompanying drawings, wherein.

DESCRIPTION OF THE EMBODIMENTS

Figure 1:
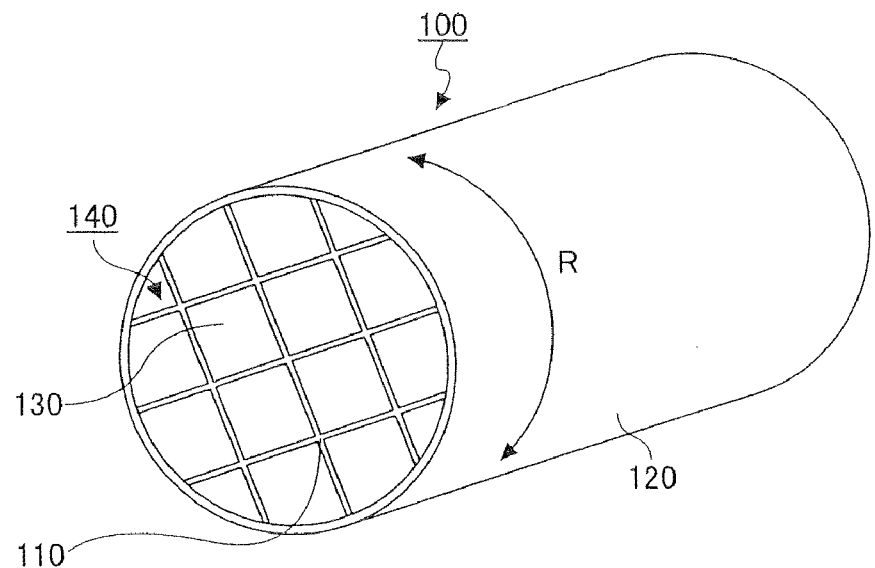
FIG. 1 is a schematic and perspective view of an example of a catalyst carrier of an embodiment of the present invention.

The embodiments will now be described with reference to the accompanying drawings, wherein like reference numerals designate corresponding or identical elements throughout the various drawings.

According to the embodiments of the present invention, the first direction of the inorganic fiber and/or the whisker may be parallel with a longitudinal direction of the honeycomb structure. The honeycomb structure may include a plurality of pillar-shaped honeycomb units and an adhesive layer connecting the honeycomb units to each other. The catalyst carrier may have a cylindrical-shaped configuration. A catalyst may be supported at the cell wall. The catalyst may contain platinum. The cell wall may have a thickness in a range between approximately 0.1 mm and approximately 0.4 mm.

It is preferable that the specific surface area of a honeycomb unit forming the honeycomb structure is in a range approximately 25000 $m^2/L$ through approximately 70000 $m^2/L$. It is also preferable that the inorganic fibers or whiskers comprises alumina, silica, silicon carbide, silica-alumina, glass, potassium titanate, or aluminum borate.

It is also preferable that an average aspect ratio of the inorganic fibers or whiskers is approximately 10 through 1000. It is also preferable that composition of the honeycomb structure includes inorganic particles. It is also preferable that the inorganic particles comprises alumina, silica, zirconia, titania, ceria, mullite, or zeolite.

It is also preferable that the honeycomb structure includes an inorganic binder. It is also preferable that the inorganic binder is selected from a group consisting of alumina sol, silica sol, titania sol, water glass, clay, kaolin, montmorillonite, sepiolite, and attapulgite. It is also preferable that a honeycomb unit forming the honeycomb structure is made by applying a firing process at approximately 600 through approximately 1200° C.

The embodiments of the present invention may provide a novel and useful catalyst carrier solving one or more of the problems as previously discussed.

More specifically, the embodiments of the present invention may provide a catalyst carrier having high isostatic strength.

A further description of the embodiment of the present invention is given below, with reference to FIG. 1 through FIG. 7.

The embodiment of the present invention provides a catalyst carrier including a honeycomb structure where cells extending in a longitudinal direction are divided by cell walls;

and a coating layer provided at a peripheral part of the honeycomb structure; wherein the honeycomb structure and the coating layer contain at least one of the inorganic fiber and whiskers; at least one of the inorganic fiber and the whisker contained in the honeycomb structure is oriented mainly in a first direction and at least one of the inorganic fiber and the whisker contained in the coating layer is oriented mainly in a second direction; and the first direction and the second direction cross at substantially right angles to each other.

According to the embodiment of the present invention, it is possible to provide a catalyst carrier having high isostatic strength because the orientation directions of the inorganic fiber and/or the whisker fiber included in the honeycomb structure and the inorganic fiber and/or the whisker included in the coating layer are selected as mentioned above. Other objects, features, and advantages of the present invention will become more apparent from the following detailed description when read in conjunction with the accompanying drawings.

Figure 2:
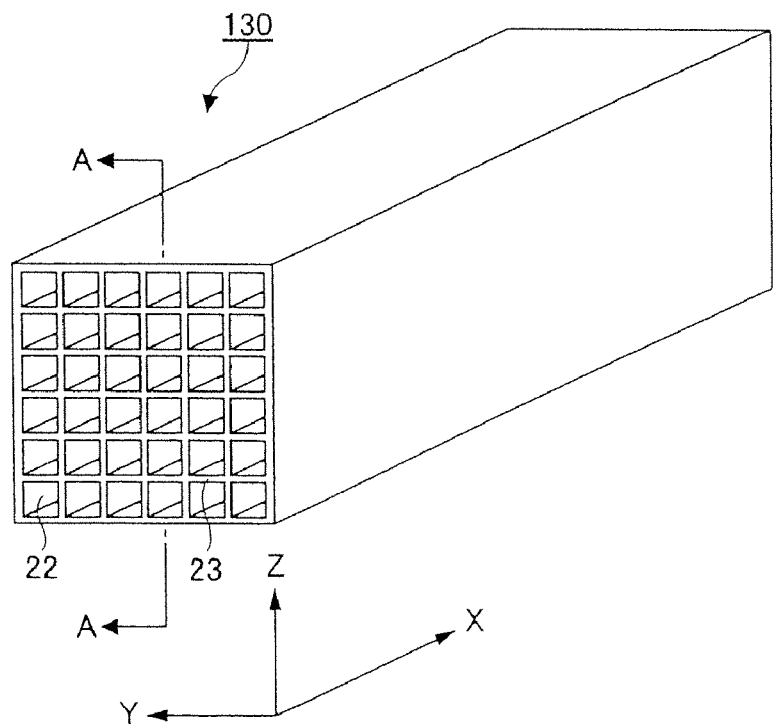
FIG. 2 is a schematic and perspective view of an example of a honeycomb unit composing the catalyst carrier of the embodiment of the present invention shown in FIG. 1.
Figure 3:
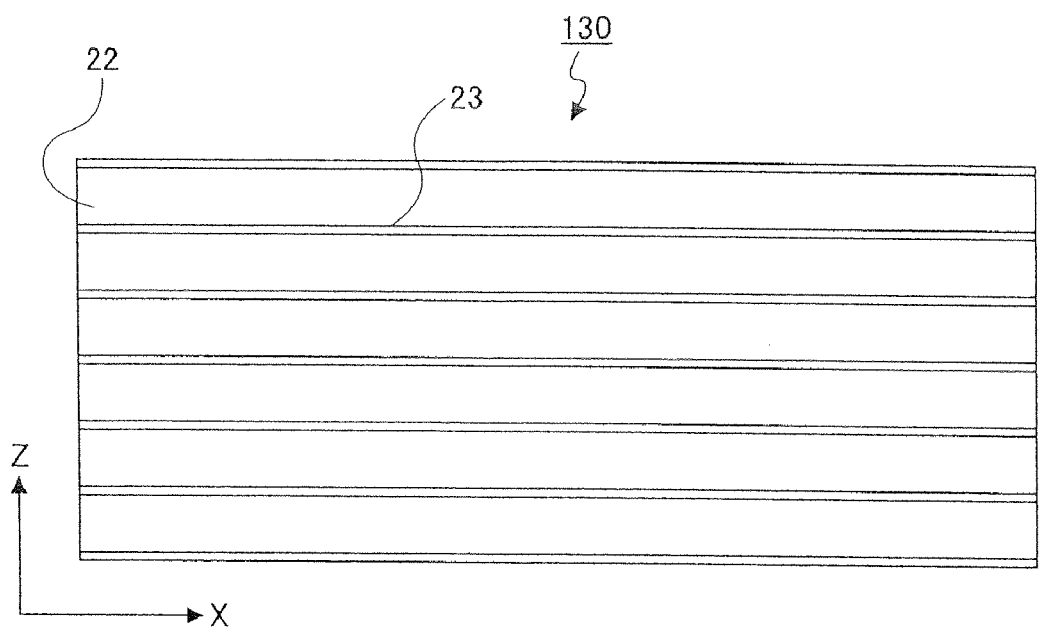
FIG. 3 is a schematic and cross-sectional view taken along a line A-A of the honeycomb unit shown in FIG. 2.

FIG. 1 is a schematic and perspective view of an example of a catalyst carrier of the embodiment of the present invention. FIG. 2 is a schematic and perspective view of an example of a honeycomb unit which is a basic unit of a honeycomb structure composing the catalyst carrier the embodiment of the present invention shown in FIG. 1. FIG. 3 is a schematic and cross-sectional view taken along a line A-A of the honeycomb unit shown in FIG. 2.

As shown in FIG. 1, a catalyst carrier 100 includes a honeycomb structure 140 and a coating layer 120. The honeycomb structure 140 includes two opening surfaces and a peripheral part connecting the opening surfaces to each others. The coating layer 120 is provided on the peripheral part of the honeycomb structure 140. In a normal case, the coating layer 120 is provided along the entire length of the honeycomb structure 140 so that a configuration of the catalyst carrier 100 after the completion is adjusted.

For example, plural (four in a vertical line times four in a horizontal line, namely sixteen, in the example shown in FIG. 1) ceramic honeycomb units 130 having rectangular-pillar shapes shown in FIG. 2 are connected to each other by interposing the adhesive layer 110 and their sides are cut along a designated configuration (a cylindrical-shaped configuration in the example shown in FIG. 1), so that the honeycomb structure 140 is completed.

As shown in FIG. 2 and FIG. 3, the honeycomb unit 130 extending in a longitudinal direction includes plural cells 22 and cell walls 23. Openings are formed at both end surfaces of the cells 22. The cell walls 23 divide the cells 22. A catalyst composing a noble metal such as platinum is supported at the cell walls 23. Accordingly, in a case where the catalyst carrier is actually used, exhaust gas flowing from one end part to the cells 22 of the honeycomb unit 130 comes in contact with the catalyst when passing through the cells 22. Because of this, harmful ingredients such as CO, HC, and NOx contained in the exhaust gas are converted. In addition, the converted exhaust gas is discharged from the other end part of the cells 22.

The honeycomb unit 130 is made of inorganic particles and inorganic fibers and/or whiskers. The coating layer 120 is also made of the inorganic particles and the inorganic fibers. The honeycomb unit 130 and the coating layer 120 may contain an inorganic binder.

In the catalyst carrier 100 of the embodiment of the present invention, the orientation of the inorganic fiber and/or the whisker contained in the honeycomb unit 130 forming the honeycomb structure 140 and the orientation of the inorganic fiber and/or the whisker contained in the coating layer 120 cross at substantially right angles to each other.

That the orientations cross at substantially right angles means that the orientations cross in the range approximately 60 degrees through approximately 90 degrees to each other. For example, in the catalyst carrier 100 shown in FIG. 1 of the embodiment of the present invention, while most of the inorganic fibers and/or the whiskers of the honeycomb unit 130 are oriented along a substantially longitudinal direction, namely an X direction in FIG. 2, most of the inorganic fibers and/or the whiskers of the coating layer 120 are oriented along a substantially peripheral direction, namely an arrow R direction in FIG. 1.

Under this structure of the catalyst carrier 100, the inorganic fibers and/or the whiskers which are contained in the honeycomb unit 130 and the coating layer 120 and which can contribute to strength are oriented so as to mutually cross at an inside (namely, the honeycomb unit 130) and an outside (namely, the coating layer 120) of the catalyst carrier 100.

Therefore, comparing the catalyst carrier 100 according to the embodiment of the present invention to a catalyst carrier where the inorganic fibers and/or the whiskers are randomly oriented, the strength of the catalyst carrier 100, especially isostatic strength, is improved. Here, the isostatic strength is a compressive breaking force whereby the catalyst carrier is broken when the isotropic hydrostatic force is applied to the catalyst carrier 100. The isostatic strength is defined by JASO standard M505-87 that is an automobile standard issued by the Society of Automotive Engineers of Japan.

Therefore, in the embodiment of the present invention, it is possible to improve the strength of the catalyst carrier 100 while the specific surface area of the honeycomb structure 140 remains equal to or higher than that of the conventional art.

In the above-discussed example, the inorganic fibers and/or the whiskers of the honeycomb unit 130 are oriented in parallel with a longitudinal direction and the inorganic fibers and/or the whiskers of the coating layer 120 are oriented in a peripheral direction so that the inorganic fibers and/or the whiskers cross at right angles. However, the combination of the orientations of the inorganic fibers and/or the whiskers of the honeycomb unit 130 and the coating layer 120 is not limited to this.

For example, the inorganic fibers of the honeycomb unit 130 may be oriented perpendicular to the longitudinal direction, namely in a Y direction or a Z direction of FIG. 2, and the inorganic fibers and/or the whiskers of the coating layer 120 may be oriented in the longitudinal direction of the honeycomb unit 130.

However, from the viewpoint of easy manufacturing, it may be general practice that the orientations of the inorganic fibers and/or the whiskers of the honeycomb unit 130 and the coating layer 120 are selected like the above-discussed example so that the inorganic fibers and/or the whiskers of the honeycomb unit 130 are oriented in parallel with the longitudinal direction and the inorganic fibers and/or the whiskers of the coating layer 120 are oriented in the peripheral direction.

The foregoing JASO standard M505-87 is hereby incorporated herein by reference.

In the catalyst carrier 100 of the embodiment of the present invention, there is no limitation of the specific surface area of the honeycomb unit 130. It is preferable that the specific surface area of the honeycomb unit 130 be in a range approximately 25000 $m^2/L$ through approximately 70000 $m^2/L$.

The above-discussed catalyst carrier of the embodiment of the present invention can be used, for example, an exhaust gas processing device of a vehicle.

Figure 4:
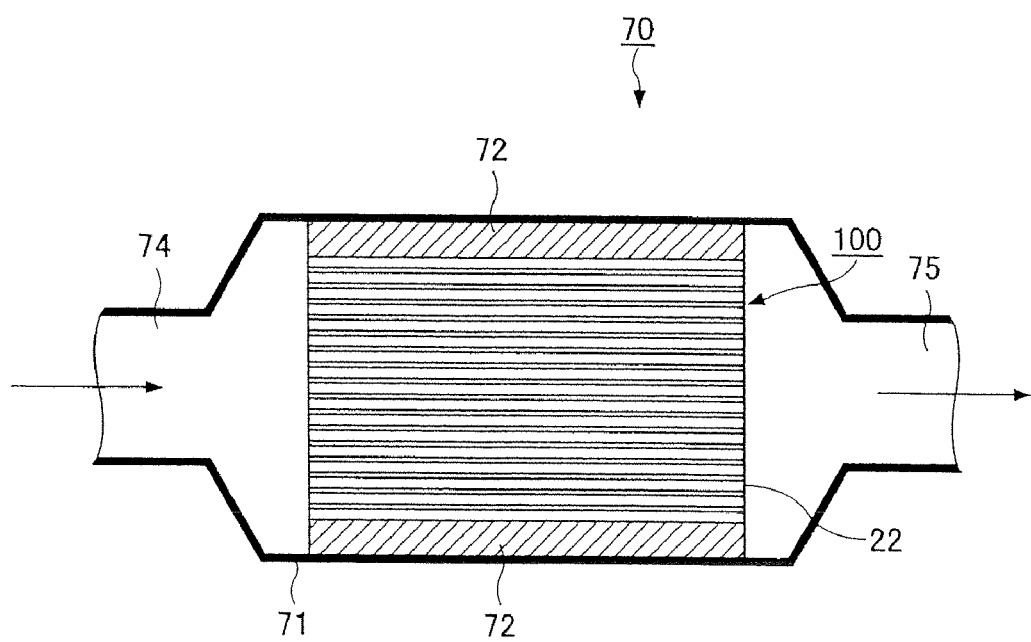
FIG. 4 is a schematic and cross-sectional view of an exhaust gas processing device where the catalyst carrier of the embodiment of the present invention is provided.

FIG. 4 is a schematic and cross-sectional view of an exhaust gas processing device 70 where the catalyst carrier 100 of the embodiment of the present invention is provided.

As shown in FIG. 4, the exhaust gas processing device 70 includes the catalyst carrier 100, a metal casing 71 housing the catalyst carrier 100, and a holding seal member 72 provided between the catalyst carrier 100 and the casing 71.

The holding seal member 72 holds the catalyst carrier 100 in a proper position. An introduction pipe 74 is connected to an end part (introducing part) of the exhaust gas processing device 70. The introduction pipe 74 introduces the exhaust gas discharged from an internal combustion engine. A discharge pipe 75 is connected to the other end part (discharging part) of the exhaust gas processing device 70. The discharge pipe 75 discharges the exhaust gas. In FIG. 4, the flow of the exhaust gas is indicated by arrows.

The exhaust gas discharged from the internal combustion engine flows through the introduction pipe 74 and is introduced into the casing 71. The exhaust gas passes through the cells 2 from the end surface of the catalyst carrier 100 facing the introduction pipe 74 so as to flow into the honeycomb structure 140.

During a process when the exhaust gas flowing in the honeycomb structure 140 passes through the cells 22, by reaction with the catalyst, harmful ingredients such as CO, HC, and NOx contained in the exhaust gas are converted. After that, the exhaust gas passes through the other end surface of the catalyst carrier 100 and is discharged from the exhaust gas processing device 70 so as finally pass through the discharge pipe 75 and be discharged outside.

In the above-discussed exhaust gas processing device 70, since the catalyst carrier 100 is formed of the honeycomb structure having a specific surface area as high as that of the conventional art, the catalyst carrier 100 has good converting abilities. In addition, in the catalyst carrier 100, the orientation of the inorganic fibers and/or whiskers contained in the honeycomb structure 140 and the orientation of the inorganic fibers and/or whiskers contained in the coating layer 120 cross at substantially right angles.

Therefore, the catalyst carrier 100 has good strength against compression stress in the peripheral direction applied from the casing member 71 to the holding seal member 72. Accordingly, in the embodiment of the present invention, while the honeycomb structure 140 has a high specific surface area, it may be possible to prevent from its being damaged at the time of use.

In the meantime, in the above explanation, the catalyst carrier 100 is discussed as an example, where the honeycomb structure 140 (so-called "connection type honeycomb structure") formed by plural honeycomb units 130 connected to each other by interposing the adhesive layers 110 as shown in FIG. 1 is used as a basic structure. However, it is clear for one skilled in the art that the embodiment of the present invention can be applied to a catalyst carrier where a honeycomb structure (so-called "unified type honeycomb structure") made of a single honeycomb unit and formed united without the adhesive 110 is used as a basic structure.

In other words, in this case, by the orientation of inorganic fibers and/or whiskers contained in the unified type honeycomb structure and the orientation of inorganic fibers and/or whiskers contained in a coating layer provided on a peripheral surface of the unified type honeycomb structure crossing at substantially right angles, it may be possible to obtain a catalyst carrier having high strength.

While there is no limitation of composition of the honeycomb unit it is preferable that the composition of the honeycomb unit include inorganic particles and inorganic fibers, and/or whiskers. This is because the specific surface area is improved due to the inorganic particles and the strength of the honeycomb unit is improved due to the inorganic fibers and/or the whiskers.

As the above-mentioned inorganic particles, it is preferable to use particles comprising alumina, silica, zirconia, titania, ceria, mullite, zeolite, or the like. These particles may be used singularly and two or more kinds thereof may be used in combination. Among the inorganic particles, alumina particles or ceria particles are desirable.

It is preferable that the above-mentioned inorganic fibers or whiskers comprising alumina, silica, silicon carbide, silica-alumina, glass, potassium titanate, aluminum borate, or the like. These fibers or whiskers may be used singularly and two or more kinds thereof may be used in combination. Among the inorganic fibers and/or whiskers, aluminum borate whiskers are desirable.

In this specification, an average aspect ratio (length/radius) of the inorganic fibers or whiskers is more than 5. A desirable average aspect ratio of the inorganic fibers or whiskers is approximately 10 through approximately 1000.

It is desirable that the lower limit of the amount of the inorganic particles contained in the honeycomb unit be approximately 30 wt %. It is more desirable that the lower limit of the amount of the inorganic particles contained in the honeycomb unit be approximately 40 wt %. It is still more desirable that the lower limit of the amount of the inorganic particles contained in the honeycomb unit be approximately 50 wt %.

On the other hand, it is desirable that the upper limit of the amount of the inorganic particles contained in the honeycomb unit be approximately 97 wt %. It is more desirable that upper limit of the amount of the inorganic particles contained in the honeycomb unit be approximately 90 wt %. It is still more desirable that upper limit of the amount of the inorganic particles contained in the honeycomb unit be approximately 80 wt %. It is most desirable that upper limit of the amount of the inorganic particles contained in the honeycomb unit be approximately 75 wt %.

If the content of the inorganic particles is approximately 30 wt % or more, the amount of the inorganic particles contributing to improvement of the specific surface area becomes relatively large. Therefore, the specific surface area as the honeycomb structure is large and catalyst ingredients may be highly dispersed when the catalyst ingredients are carried (supported).

On the other hand, if the content of the inorganic particles is approximately 97 wt % or less, the amount of the inorganic fibers and/or whiskers contributing to improvement of the strength does not become relatively small. Therefore, the strength of the honeycomb structure is not degraded.

It is desirable that the lower limit of the total amount of the inorganic fibers and/or whiskers contained in the honeycomb unit be approximately 3 wt %. It is more desirable that the lower limit of the total amount of the inorganic fibers and/or whiskers contained in the honeycomb unit be approximately 5 wt %. It is still more desirable that lower limit of the total amount of the inorganic fibers and/or whiskers contained in the honeycomb unit be approximately 8 wt %.

On the other hand, it is desirable that the upper limit of the total amount of the inorganic fibers and/or whiskers contained in the honeycomb unit be approximately 70 wt %. It is more desirable that the upper limit of the total amount of the inorganic fibers and/or whiskers contained in the honeycomb unit be approximately 50 wt %. It is still more desirable that the upper limit of the total amount of the inorganic fibers and/or whiskers contained in the honeycomb unit be approximately 40 wt %. It is most desirable that the upper limit of the total amount of the inorganic fibers and/or whiskers contained in the honeycomb unit be approximately 30 wt %.

If the content of the inorganic fiber and/or the whisker is approximately 3 wt % or more, the strength of the honeycomb structure may not be degraded. If the content of the inorganic fibers and/or the whiskers is approximately 50 wt % or less, the amount of the inorganic particles contributing to improvement of the specific surface area becomes relatively large. Therefore, the specific surface area as the honeycomb structure may not be small and catalyst ingredients may be highly dispersed when the catalyst ingredients are carried (supported).

In addition, it is desirable to manufacture the honeycomb unit by using a material composition that is a mixture containing the above-mentioned inorganic particles, inorganic fibers and/or whiskers and inorganic binders. Thus, by using the material composition containing the inorganic binder, it may be possible to obtain the honeycomb unit having proper strength even if the firing temperature is low.

As the above-mentioned inorganic binder, it is preferable to use an inorganic sol, a clay-based binder, or the like. For example, as the inorganic sol, alumina sol, silica sol, titania sol, water glass, or the like can be used. In addition, as the clay-based binder, for example, clay, kaolin, montmorillonite, clays of a double-chain structure type (sepiolite and attapulgite), or the like can be used. These particles may be used singularly and two or more kinds thereof may be used in combination.

It is preferable to use, as the inorganic binder, at least one kind selected from a group consisting of alumina sol, silica sol, titania sol, water glass, sepiolite and attapulgite.

The lower limit of the amount of the inorganic binder contained in the material composition as a portion of the total amount of the solid content of the inorganic particles, the inorganic fibers, and/or the whiskers, and the inorganic binder contained in the material composition is preferably approximately 5 wt %, more preferably approximately 10 wt %, and still more preferably approximately 15 wt %.

On the other hand, the upper limit of the amount of the inorganic binder contained in the material composition as a portion of the total amount of the solid content of the inorganic particles, the inorganic fibers, and/or the whiskers, and the inorganic binder contained in the material composition is preferably approximately 50 wt %, more preferably approximately 40 wt %, and still more preferably approximately 35 wt %.

If the inorganic binder content is approximately 5 wt % or more in amount, the strength of the honeycomb structure may not be degraded. On the other hand, if the inorganic binder content is approximately 50 wt % or less in amount, moldability may not be degraded.

The thickness of the cell walls 23 of the honeycomb unit 130 is not limited in particular. The lower limit of the cell wall thickness is preferably approximately 0.1 mm and upper limit of the cell wall thickness is preferably approximately 0.4 mm from the viewpoint of conversion of gas.

In addition, it is normal practice to make the coating layer 120 by using, as a material, paste containing the above-mentioned inorganic particles, inorganic fibers and/or whiskers, and an organic binder. As the organic binder, for example, polyvinyl alcohol, methylcellulose, ethylcellulose, carboxymethylcellulose, or the like can be used. These particles may be used singularly and two or more kinds thereof may be used in combination. Among the above-mentioned organic binders, carboxymethylcellulose is desirable.

After that, this paste is provided on the peripheral surface of the honeycomb structure and then a drying process is applied so that the coating layer 120 is formed. In the paste, if necessary, an aperture making agent such as a balloon, which is a fine hollow globe which component is an oxide family ceramic, spherical acrylic particles, graphite, and the like may be added. The thickness of the coating layer is preferably approximately 0.3 mm through approximately 2.0 mm.

In the catalyst carrier 100 of the embodiment of the present invention, a material the same as that of the coating layer 120 is used for the adhesive layers 110. However, the adhesive layer 110 may be made of a material different from that of the coating layers 120.

The catalyst carrier 100 of the embodiment of the present invention may have any configuration. For example, the catalyst carrier 100 of the present invention may have, for example, not only a cylindrical shaped configuration shown in FIG. 1 but also an elliptic cylindrical-shaped configuration, polygonal pillar-shaped configuration, or the like.

(Manufacturing Method of Catalyst Carrier)

Figure 5:
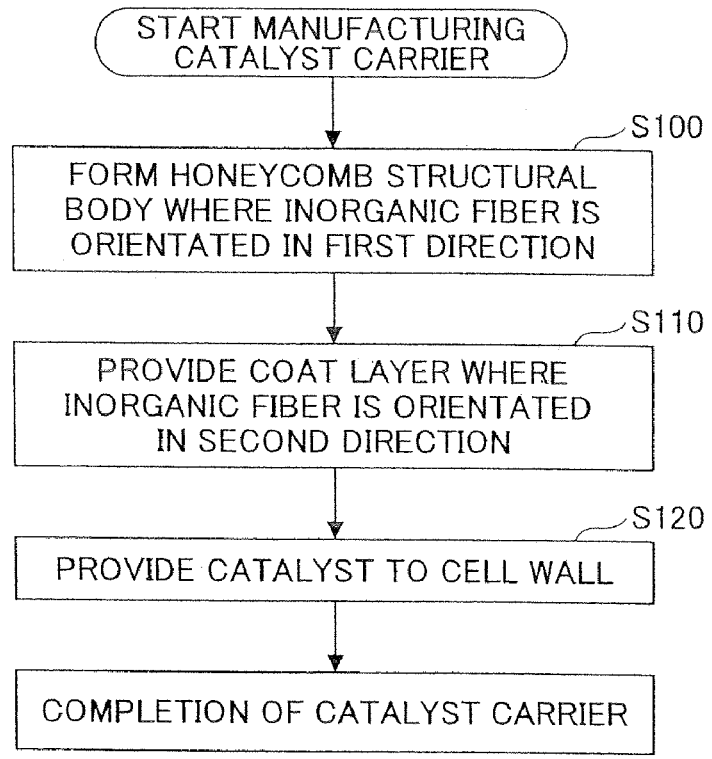
FIG. 5 is a flowchart of an example of a manufacturing flow of the catalyst carrier of the embodiment of the present invention.

Next, a manufacturing method of the catalyst carrier of the embodiment of the present invention is discussed. FIG. 5 is a flowchart of an example of a manufacturing flow of the catalyst carrier 100 of the embodiment of the present invention.

The manufacturing method of the catalyst carrier 100 of the embodiment of the present invention includes a step of forming the honeycomb structure 140 where the inorganic fibers and/or whiskers are oriented in the first direction (step S100), a step of providing the coating layer 120 where the inorganic fibers and/or whiskers are oriented in the second direction on the peripheral surface of the honeycomb structure 140 (step S110), and a step of providing the catalyst on the cell walls 23 of the honeycomb structure 140 (step S120). Details of each step are discussed below.

(Step S100)

First, in step S100, the honeycomb structure where most of the inorganic fibers and/or whiskers are oriented in the first direction is manufactured.

In the following explanation, a case is discussed where the connection type honeycomb structure is manufactured. It is clear for one skilled in the art that the unified honeycomb structure can be manufactured by the same steps except a connection step of the honeycomb unit.

By using the material paste containing the inorganic particles comprising the above-mentioned material and the inorganic fibers and/or whiskers comprising the above-mentioned material, extrusion molding is carried out by an extruder, so that a honeycomb unit molded body having, for example, a square pillar shape is manufactured.

Here, in the embodiment of the present invention, in order to make the orientation direction of the inorganic fibers and/or whiskers contained in the honeycomb unit adjusted in the longitudinal direction of the molded body as much as possible, the extrusion molding speed for extruding the material paste from the extruder is controlled so as to be approximately 400 mm/minute so that extrusion molding is carried out. By making the average length of the inorganic fibers and/or whiskers to be added long or adjusting a path in a mold or the like, it is possible to easily adjust the orientation of the inorganic fibers and/or whiskers contained in the honeycomb unit.

The material paste is not limited in particular. It is preferable to use a material paste whereby the porosity of the manufactured honeycomb unit is, for example, approximately 40% through approximately 75%. For example, a material paste where a binder, a dispersion solvent, and others are added to the above-mentioned inorganic particles and the inorganic fibers and/or whiskers may be used.

The organic binder is not limited in particular. As the organic binder, for example, one or more kinds of an organic binder selected from a group consisting of methylcellulose, carboxymethylcellulose, hydroxyethylcellulose, polyethylene glycol, and the like can be used. A mixing amount of the organic binder is preferably approximately 1 weight % through approximately 10 weight % of 100 weight % that is the total of ceramic particles, inorganic fiber and/or whiskers, and inorganic binder. The dispersion solvent is not limited in particular. As the dispersion solvent, for example, water, organic solvent such as benzene, or alcohol such as methanol, or the like can be used.

These inorganic powder, inorganic fiber and/or whisker, binder and dispersion solvent are mixed by an attritor or the like and kneaded by a kneader or the like and then extrusion molded.

A molding assistant may be added to the material paste if necessary. The molding assistant is not limited in particular. As the molding assistant, ethylene glycol, dextrin, fatty acid, fatty acid soap, polyvinyl alcohol and the like can be used, for example. Furthermore, an aperture making agent such as the balloon, which is a fine hollow globe which component is oxide family ceramic, spherical acrylic particles, graphite, and the like may be added to the material of the paste, if necessary.

Next, it is preferable that the molded body formed by the extrusion molding be dried. While there is no limitation of a dryer, a micro dryer, a hot-air dryer, a dielectric dryer, a decompression dryer, a vacuum dryer a freeze dryer, and the like can be used. In addition, it is preferable to implement degreasing of the molded body. Conditions for degreasing are not limited in particular but are properly selected depending on kinds or amounts of organics contained in the molded body.

For example, it is preferable to conduct the degreasing process for approximately 2 hours at approximately 400° C. In addition, it is preferable to apply a firing process to the molded body. Conditions for firing are not limited in particular. For example, it is preferable to carry out the firing process at approximately 600° C. through approximately 1200° C. It is more preferable to carry out the firing process at approximately 600° C. through approximately 1000° C.

This is because if the firing temperature is approximately 600° C. or more, sintering of the ceramic particles may progress so that the strength of the honeycomb structure is high. If the firing temperature is 1200° C. or less, sintering of the ceramic particles may not progress too much so that the specific surface area per unit volume may not become small. As a result of the above-discussed processes, most of the inorganic fibers and/or whiskers of the honeycomb unit are oriented in parallel with the longitudinal direction.

Next, after a paste for adhesive layer is applied with equal thickness on the side surface of the honeycomb unit, other honeycomb units are stacked in order by interposing the paste for the adhesive layer. By repeating this step, a honeycomb structure is manufactured having desirable size and four vertical lines and four horizontal lines of the honeycomb units.

The paste for the adhesive layer is not limited in particular. As the paste for the adhesive layer, for example, a mixture of the inorganic binder and the ceramic particles, a mixture of the inorganic binder and the inorganic fibers and/or whiskers, or a mixture of the inorganic binder, the ceramic particles, and the inorganic fibers and/or whiskers can be used. In addition, a member where an organic binder is added to these paste may be used.

The organic binder is not limited in particular. The organic binder may be one or more kinds of selected from a group consisting of, for example, polyvinyl alcohol, methylcellulose, ethyl cellulose, carboxymethylcellulose, or the like.

The thickness of the adhesive layer for connecting the honeycomb units is preferably approximately 0.3 mm through approximately 2.0 mm. If the thickness of the adhesive layer is approximately 0.3 mm or more, sufficient connection strength may be obtained. In addition, since the adhesive layer is a part not working as the catalyst carrier, if the thickness of the adhesive layer is approximately 2.0 mm or less, the specific surface area per a unit volume of the honeycomb structure 140 may not be degraded.

Next, this honeycomb structure 140 is heated, the paste for the adhesive layers is dried and fixed so that the adhesive layers are formed, and the honeycomb units 130 are adhered to each other.

Then, by using a diamond cutter or the like, the honeycomb structure is cut in, for example, a cylindrical shape, so that a cylindrical shaped honeycomb structure 140 is manufactured.

Figure 6:
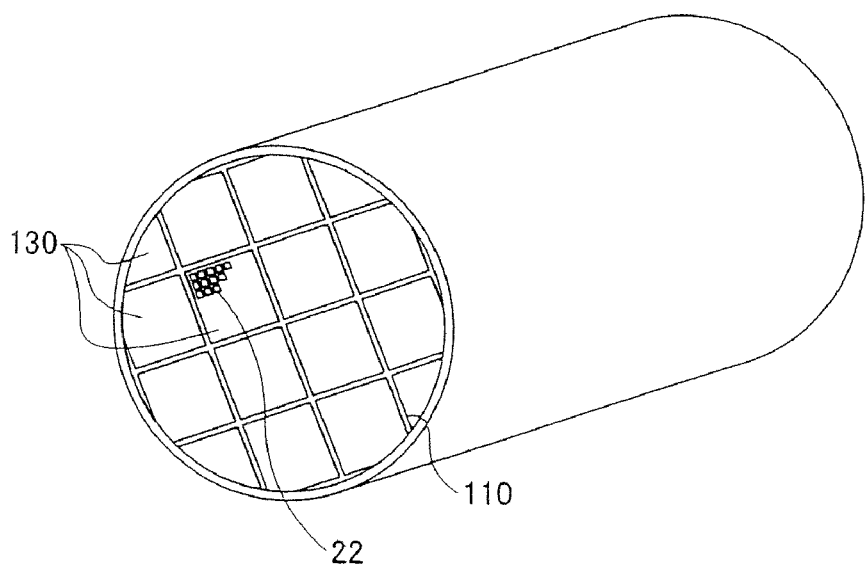
FIG. 6 is a schematic and perspective view of a catalyst carrier manufactured by another method of the embodiment of the present invention.

For example, as shown in FIG. 6, the honeycomb units 130 are molded so as to have fan-shaped cross sections or square-shaped cross sections. Then, the honeycomb units 130 are connected to each other and a designated configuration of a honeycomb structure 140 (cylindrical shaped configuration in the example shown in FIG. 6) is formed, so that cutting and polishing processes can be omitted.

(Step S110)

Next, in step S110, the coating layer 120 where most of the inorganic fibers and/or whiskers are oriented in the second direction, namely in a direction substantially perpendicular to the first direction, are provided on the above-discussed honeycomb structure 140 in step S110.

Figure 7:
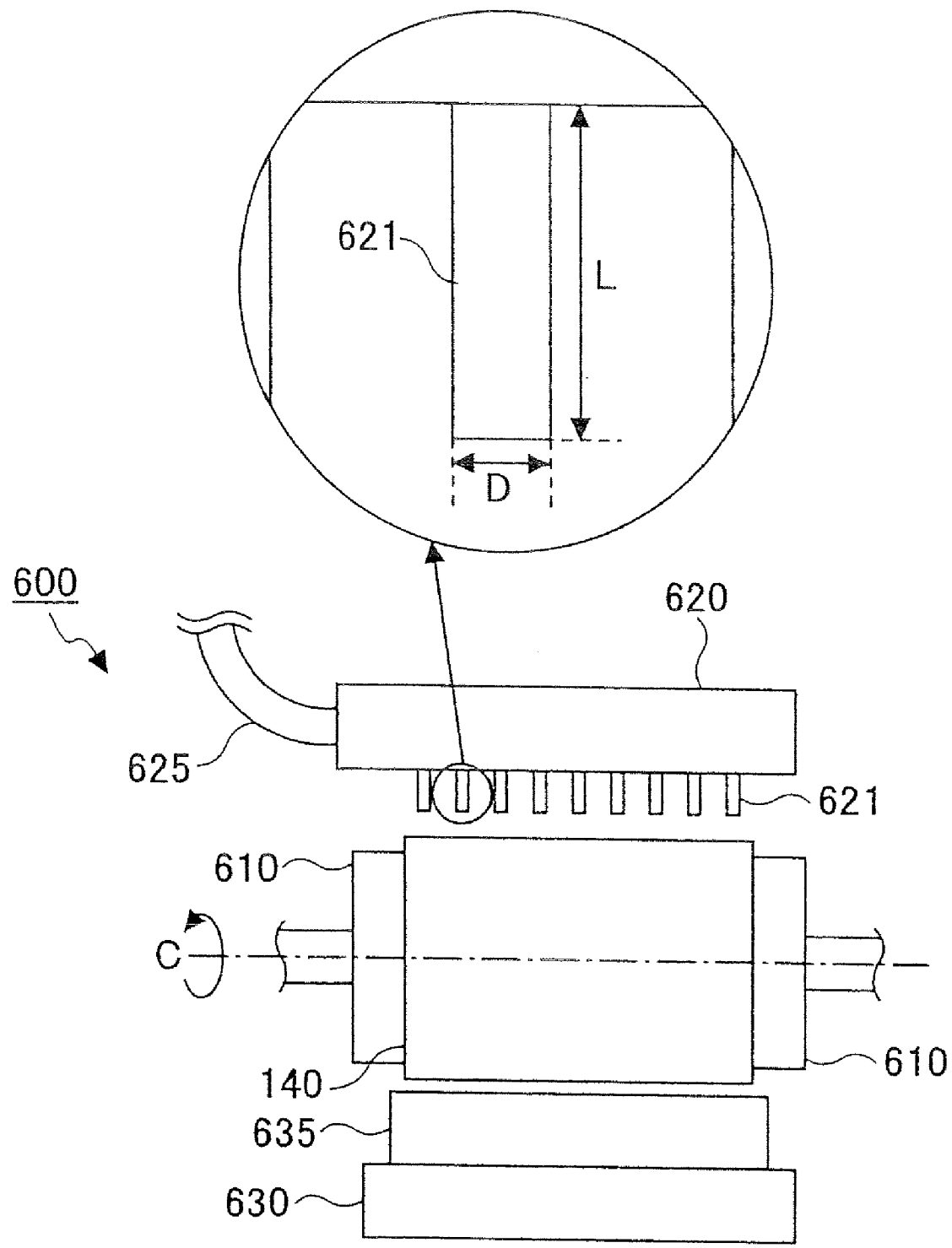
FIG. 7 is a view showing an example of a providing device for providing material paste for a coating layer.

First, the material paste for the coating layer 120 is provided on the peripheral part of the honeycomb structure 140. FIG. 7 is a view showing an example of a providing device for providing the material paste for the coating layer 120.

As shown in FIG. 7, a providing device 600 includes a holding device 610, a paste supplier 620, and a paste homogenizing part 630. While the paste supplier 620 and the paste homogenizing part 630 are provided so as to face each other in the example shown in FIG. 7, it is desirable that the paste supplier 620 and the paste homogenizing part 630 be close to each other.

The holding device 610 can hold end surfaces of the honeycomb structure 140. In addition, the holding device 610 has a part which can rotate the honeycomb structure 140 with respect to a longitudinal axis C.

The paste supplier 620 is connected to a paste holder (not shown in FIG. 7) where the material paste for the coating layer 120 is held, via a pipe 625. A stop valve (not shown in FIG. 7) and others are provided at the pipe 625. In addition, a large numbers of nozzles 621 are provided on a single side surface of the paste supplier 620 in a horizontal direction of FIG. 7. The surface of the paste supplier 620 where the nozzles 621 are provided is arranged so as to face the peripheral surface of the honeycomb structure 140 held by the holding device 610.

The paste homogenizing part 630 includes a blade 635 formed along the horizontal direction of FIG. 7. The paste homogenizing part 630 is arranged so as to form a designated gap with the peripheral surface of the honeycomb structure 140 provided at the holding device 610.

Each nozzle 621 of the paste supplier 620 has width D and length L. In addition, the blade 635 of the paste homogenizing part 630 has length equal to or more than the entire length of the honeycomb structure 140. In addition, the blade 635 has a blade head end. It is desirable that the blade 635 be made of an elastic body such as rubber or plastic so that the blade 635 can be flexibly deformed when the blade 635 comes in contact with the rotating honeycomb structure 140.

By using the providing device 600 of the material paste having the above-discussed structure, the material paste for the coating layer 120 is provided on the peripheral surface of the honeycomb structure 140 as discussed below.

First, the honeycomb structure 140 is held at the holding device 610. In addition, the paste supplier 620 and the paste homogenizing part 630 are provided so that a slight gap with the peripheral surface of the honeycomb structure is formed. The length from the head end of each nozzle 621 of the paste supplier 620 to the peripheral surface of the honeycomb structure is normally in a range between approximately 5 mm and approximately 10 mm. The length from the head end of the blade 635 of the paste homogenizing part 630 to the peripheral surface of the honeycomb structure is normally in a range between approximately 0.3 mm and approximately 2.0 mm.

Next, the honeycomb structure is rotated with respect to the C axis. The rotational speed is, for example, approximately 10 rpm through approximately 50 rpm. After that, the above-mentioned stop valve is opened so that the material paste for the coat layer 120 filling the paste holder is supplied to the paste supplier via the pipe 625.

This material paste is pressed and conveyed via the nozzles 621 so as to be applied to the peripheral surface of the honeycomb structure 140. The material paste is applied and spread evenly on the peripheral surface of the honeycomb structure 140 by the blade 635 so that the material paste having equal thickness (for example, approximately 0.3 mm through approximately 2.0 mm) is provided on the peripheral surface of the honeycomb structure 140.

Here, in the embodiment of the present invention, the inorganic fibers and/or whiskers in the coating layer 120 are oriented substantially perpendicular to the orientation of the inorganic fiber and/or whisker in the honeycomb structure 140 (honeycomb unit). Therefore, the dimensions of the nozzle 621 of the paste supplier 629 are adjusted as follows. That is, the width D of the nozzle is approximately 0.1 mm through approximately 1.0 mm or the diameter of the nozzle is approximately 0.1 mm through approximately 1.0 mm, and the length L of the nozzle is approximately 5 mm through approximately 20 mm.

Through the experiment performed by an inventor of the present invention, it was found that the orientation of the inorganic fibers and/or whiskers contained in the material paste for the coat layer 120 provided on the peripheral surface of the honeycomb structure 140 can be made uniform with a extruding direction of the paste when the nozzles being used have the width D and the length L adjusted in the above-mentioned ranges.

Accordingly, via the above-discussed step, the material paste for the coating layer 120 is provided so that the orientation of the inorganic fibers and/or whiskers contained in the coating layer 120 finally obtained can be made uniform with the peripheral direction.

After that, the material paste provided on the honeycomb structure is dried so that the coating layer 120 is fixed. As a result of this, the honeycomb structure 140 can be manufactured where the orientation directions of the inorganic fibers and/or whiskers in the honeycomb units 130 and the coating layer 120 cross at substantially right angles.

(Step S120)

Next, in step S120, the catalyst is provided to the cell walls 23 of the honeycomb units 130 forming the honeycomb structure 140. A material of the catalyst is not limited in particular. As the material of the catalyst, for example, noble metal such as platinum, palladium, or rhodium can be used. In addition, a compound including alkali metal, alkali earth metal, a rare earth element, transition metal, or the like may be carried.

In order to provide a platinum catalyst, for example, a method can be used wherein the honeycomb unit where the catalyst carrier layer is provided is impregnated with nitric acid solution of dinitrodiammine platinum ($[Pt(NH_3)_2(NO_2)_2]HNO_3$) or the like and a heating process is applied.

In the above-discussed example of the manufacturing method, the step of supporting (carrying) the catalyst is implemented after the coating layer 120 is provided at the peripheral part of the honeycomb structure 140 but may be implemented before the honeycomb units 130 are stacked. Via these steps, the catalyst carrier where the catalyst is supported at the cell walls 23 is manufactured.

As discussed above, in the catalyst carrier according to the embodiment of the present invention, the orientation directions of the inorganic fibers and/or whiskers in the honeycomb units 130 and the coating layer 120 cross at substantially right angles. Hence, it is possible to obtain the catalyst carrier having both properties of the high specific surface area and the high strength.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is as new and desired to be secured by Letters Patent of the United States is:

1. A catalyst carrier, comprising:
   a honeycomb structure where cells extending in a longitudinal direction are divided by cell walls; and
   a coating layer provided at a peripheral part of the honeycomb structure;
   wherein the honeycomb structure contains a plurality of inorganic fibers and the coating layer contains a plurality of whiskers;
   most of the inorganic fibers contained in the honeycomb structure are oriented in a first direction and most of the whiskers contained in the coating layer are oriented in a second direction; and
   the first direction and the second direction cross at substantially right angles to each other.

2. The catalyst carrier as claimed in claim 1,
   wherein the first direction is parallel with a longitudinal direction of the honeycomb structure.

3. The catalyst carrier as claimed in claim 1,
   wherein the honeycomb structure includes a plurality of pillar-shaped honeycomb units and an adhesive layer connecting the honeycomb units to each other.

4. The catalyst carrier as claimed in claim 1,
   wherein the catalyst carrier has a cylindrical-shaped configuration.

5. The catalyst carrier as claimed in claim 1,
   wherein the cell wall has a thickness in a range between approximately 0.1 mm and approximately 0.4 mm.

6. The catalyst carrier as claimed in claim 1,
   wherein the specific surface area of a honeycomb unit forming the honeycomb structure is in a range approximately 25000 $m^2/L$ through approximately 70000 $m^2/L$.

7. The catalyst carrier as claimed in claim 1,
wherein the inorganic fibers or whiskers comprise alumina, silica, silicon carbide, silica-alumina, glass, potassium titanate, or aluminum borate.

8. The catalyst carrier as claimed in claim 1,
wherein an average aspect ratio of the inorganic fibers or whiskers is approximately 10 through 1000.

9. The catalyst carrier as claimed in claim 1,
wherein the honeycomb structure further comprises inorganic particles.

10. The catalyst carrier as claimed in claim 9,
wherein the inorganic particles comprise alumina, silica, zirconia, titania, ceria, mullite, or zeolite.

11. The catalyst carrier as claimed in claim 1,
wherein the honeycomb structure includes an inorganic binder.

12. The catalyst carrier as claimed in claim 11,
wherein the inorganic binder is selected from a group consisting of alumina sol, silica sol, titania sol, water glass, clay, kaolin, montmorillonite, sepiolite, and attapulgite.

13. The catalyst carrier as claimed in claim 1,
wherein a honeycomb unit forming the honeycomb structure is made by applying a firing process at approximately 600 through approximately 1200° C.

14. An exhaust gas processing device comprising:
a catalyst carrier comprising:
   a honeycomb structure where cells extending in a longitudinal direction are divided by cell walls; and
   a coating layer provided at a peripheral part of the honeycomb structure;
   wherein the honeycomb structure contains a plurality of inorganic fibers and the coating layer contains a plurality of whiskers;
   most of the inorganic fibers contained in the honeycomb structure are oriented in a first direction and most of the whiskers contained in the coating layer are oriented in a second direction; and
   the first direction and the second direction cross at substantially right angles to each other; and
a catalyst supported at the cell walls.

15. The exhaust gas processing device as claimed in claim 14,
wherein the catalyst contains platinum.

16. A method of forming the catalyst carrier of claim 1 comprising:
   forming a honeycomb structure to have cells extending in a longitudinal direction, wherein the honeycomb structure is divided by cell walls and wherein the honeycomb structure contains a plurality of inorganic fibers; and
   providing a coating layer at a peripheral part of the honeycomb structure, wherein the coating layer contains a plurality of whiskers,
   wherein most of the inorganic fibers contained in the honeycomb structure are oriented in a first direction and most of the whiskers contained in the coating layer are oriented in a second direction, and
   wherein the first direction and the second direction cross at substantially right angles to each other.

17. The method of claim 16, wherein the honeycomb structure has first and second ends parts, and wherein the method further comprises:
   positioning the honeycomb structure so that exhaust gases flowing into the first end part and flow out of the second end part; and
   removing harmful ingredients from the exhaust gases.

18. The method of claim 17, wherein the harmful ingredients include at least one of CO, HC, and NOx.

* * * * *